(12) United States Patent
White et al.

(10) Patent No.: US 12,316,507 B2
(45) Date of Patent: May 27, 2025

(54) SITE NETWORK SERVICE DESIGN

(71) Applicant: MICROSOFT TECHNOLOGY LICENSING, LLC, Redmond, WA (US)

(72) Inventors: Peter Louis White, Edinburgh (GB); Calum Sutherland Loudon, Edinburgh (GB); Paul John Brittain, Chester (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 319 days.

(21) Appl. No.: 17/958,379

(22) Filed: Oct. 1, 2022

(65) Prior Publication Data

US 2024/0048455 A1 Feb. 8, 2024

(30) Foreign Application Priority Data

Aug. 2, 2022 (GB) ...................................... 2211264

(51) Int. Cl.
*H04L 41/14* (2022.01)
*H04L 41/08* (2022.01)
(Continued)

(52) U.S. Cl.
CPC ........ *H04L 41/145* (2013.01); *H04L 41/0895* (2022.05); *H04L 41/40* (2022.05); *H04L 41/5054* (2013.01)

(58) Field of Classification Search
CPC ... H04L 41/145; H04L 41/0895; H04L 41/40; H04L 41/5054; H04L 41/0886; H04L 41/5041; H04L 41/0806; H04L 41/14
See application file for complete search history.

(56) References Cited

U.S. PATENT DOCUMENTS

2016/0094841 A1 * 3/2016 Wang ................... H04N 17/002
  348/44
2019/0199597 A1 * 6/2019 Valisammagari ..... H04L 41/145
(Continued)

FOREIGN PATENT DOCUMENTS

CN   115733743 A  *  3/2023
ES   2607636 T3  *  4/2017  ............... G06F 8/61
(Continued)

OTHER PUBLICATIONS

"International Search Report and Written Opinion Issued in PCT Application No. PCT/US23/027447", Mailed Date: Oct. 20, 2023, 14 Pages.
(Continued)

*Primary Examiner* — Alina A Boutah
(74) *Attorney, Agent, or Firm* — Han Gim; Newport IP, LLC

(57) ABSTRACT

A site network service (SNS) design is deployed in a computing system. A network function (NF) design is received and transferred to a data store. A network service (NS) design is generated that includes a reference to a NF design from the data store and a NS configuration including information for partially configuring the referenced NF design. The NS design is transferred to the data store. A SNS design is deployed that includes a reference to the NS design from the data store and a SNS configuration.

18 Claims, 6 Drawing Sheets

(51) Int. Cl.
*H04L 41/0895* (2022.01)
*H04L 41/40* (2022.01)
*H04L 41/5054* (2022.01)

(56) References Cited

U.S. PATENT DOCUMENTS

2021/0320850 A1* 10/2021 Young ................. H04L 41/5012
2022/0141760 A1    5/2022 Priya et al.
2022/0294691 A1*  9/2022 Kumar Skand Priya ....................
                                                                G06F 8/60
2023/0379221 A1* 11/2023 Draznin .................. H04L 41/40

FOREIGN PATENT DOCUMENTS

| WO | WO-2016141573 A1 * | 9/2016 | ......... H04L 41/0893 |
| WO | WO-2016145653 A1 * | 9/2016 | .......... G06F 11/0709 |
| WO | WO-2018090993 A1 * | 5/2018 | ............. H04L 41/08 |

OTHER PUBLICATIONS

Tranoris, et al., "Onboarding Vertical Applications on 5G-VINNI Facility", In Technical Report, Mar. 5, 2020, 27 Pages.
Tranoris, et al., "Publication of first version of service catalogues to vertical consumers", Retrieved from : https://zenodo.org/records/3345620, Jul. 9, 2019, pp. 1-102.

* cited by examiner

SITE NETWORK SERVICE DESIGN

CROSS-REFERENCE TO RELATED APPLICATION(S)

This non-provisional utility application claims priority to UK patent application number 2211264.3 entitled "SITE NETWORK SERVICE DESIGN" and filed on Aug. 2, 2022, which is incorporated herein in its entirety by reference.

BACKGROUND

Telecommunications is the exchange of data or information over distances by electronic means and may include but are not limited to voice, data and/or video transmission, e.g., 5G, voicemail services, and video streaming. Telecommunications services require an extremely high level of service availability. National communications infrastructure, such as an emergency telephone system, should be available 99.999% of the time, which is sometimes referred to as 5 9 s. Downtime of telecommunication systems may cause a danger to life, a security risk and commercial losses. Sixty percent of telecommunication system outages are caused by failed upgrades or by configuration changes, frequently due to instantiating an incorrect site network service design in one or more data centers at one or more locations.

A telecommunication service may be made from a network service (NS). NSs are built from blocks of other software and underlying infrastructure. The building blocks of "other software" are called network functions (NFs) and consist of virtual machines (VMs), containers or other packagings of compute functions together with associated resources such as IP addresses and disks. NFs have defined external interfaces and a defined functional behavior. Generally, a NF may be defined as a functional building block within a network infrastructure, which has defined external interfaces a defined functional behavior. A NS is a composite service consisting of NFs and associated cloud resources.

5G networks require specially orchestrated network systems to support a high bandwidth and low latency wireless data network.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A first aspect is a computer-implemented method for creating a site network service (SNS) design, the method comprising: arranging a network function (NF) design; transferring the created NF design to a data store; arranging a network service (NS) design, wherein the arranged NS design comprises a reference to a NF design from the datastore, and a NS configuration related to settings of a configuration of the NF design, and transferring the arranged NS design to the data store; arranging a site network service (SNS) design, wherein the arranged SNS design comprises a reference to the NS design from the data store and a SNS configuration related to the NS configuration of the NS design, and wherein a number of settings supplied to the NS design by the SNS configuration is less than a number of settings required to configure the NF design.

A second aspect is a computerized system for arranging a site network service (SNS) design, the system comprising: a processor; and computer storage memory having computer-executable instructions stored thereon which, when executed by the processor, implement a method comprising creating a network function (NF) design; transferring the created NF design to a data store; creating a network service (NS) design, wherein the created NS design comprises a reference to a NF design from the data store, and a NS configuration comprising information to partially configure the referenced NF design; and transferring the created NS design to the data store; arranging a SNS design, wherein the arranged SNS design comprises a reference to a NS design from the data store and a SNS configuration, wherein the SNS configuration comprises information to fully configure the NF design referenced by the NS design.

A third aspect is a computerized system for arranging a SNS, the system comprising: a processor; and computer storage memory having computer-executable instructions stored thereon which, when executed by the processor, implement a method comprising: displaying a plurality of NS designs; receiving a selection of a NS design from the displayed NS designs; receiving configuration values for the selected NS design; applying the received configuration values to a NF that is contained by the selected NS design thereby fully configuring the NF design; and creating a SNS using the selected NS design and the fully configured NF design.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
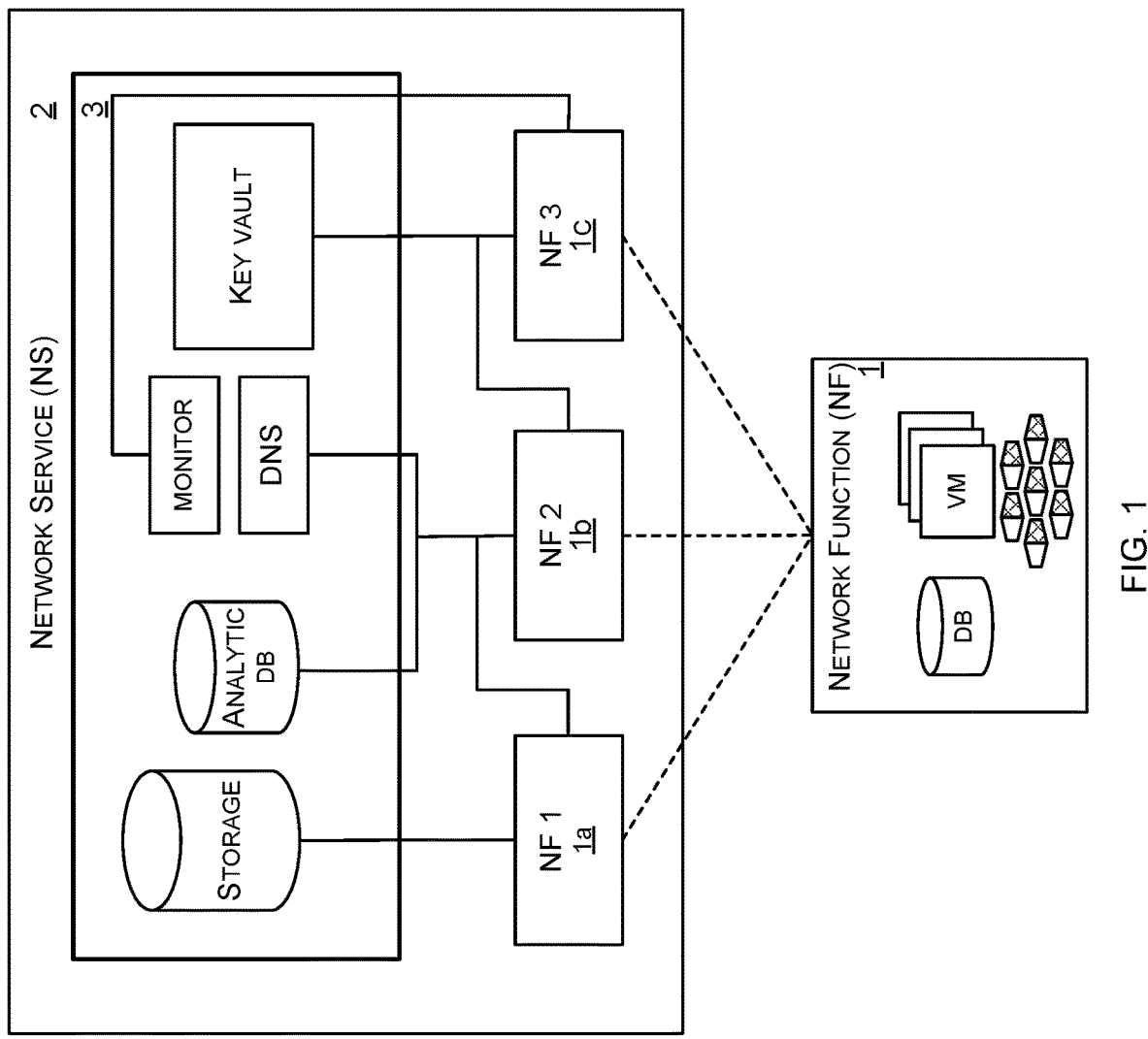
FIG. 1 is a schematic diagram illustrating a network service (NS) architecture.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

In the described examples, components of a telecommunications system are created/curated by distinct users. Only a single role, referred to as a Publisher in the description, can control a configuration interface of a NF design. Only a single role, referred to as a Designer in the description, can control a configuration interface of a NS design. A single role, referred to as an Operator in the description, can control neither a configuration interface of a NF design nor a configuration interface of a NS design, but can create a SNS design.

After each component of a telecommunications service is created (NF, NS and SNS), it may be validated by a further service to identify errors with the component. The components are hierarchical and therefore if a lowest level component—an NF design—includes an error then a higher-level component— NS or SNS design—will also include the error. By enabling validation of all components of the SNS design and the SNS design itself, likelihood of errors in the SNS design are reduced and downtime of the SNS design, when deployed, is reduced.

If a Designer and Operator roles were to be combined for a single user to perform, the single user would select NF designs and configure a SNS design in one step then the user will eliminate the intermediate validation step of an NS design, and also the SNS design creation will require all NFs to be fully configured by the user. In contrast, by creating one or more NS designs and storing the NS designs with component NF designs in partially configured form, the partial configuration of the NS designs can be validated thereby identifying errors with the partial configuration applied to the NF design. Further, the partial configuration information of an NF design is stored as a NF configuration as part of the NS design. When a subsequent user is creating a SNS design (taking an Operator role), they must provide further configuration information that is required by the NS design in order to complete configuration of NF design(s) contained within the NS design. The further configuration information is less than a full configuration of the NF designs contained within the SNS design thereby increasing speed of SNS design creation and also reducing the likelihood of errors in misconfiguring NF designs as part of SNS designs. Generally, the disclosed system for arranging a SNS design decreases network downtime and increases security as control of user access is more restricted for individual users or user groups.

The system in the examples described herein and illustrated in the figures enable a separation out of a design element of the SNS to be performed by an Operator role, i.e. the separation out of the architectural design consideration required to determine how to build an end-to-end SNS from all available building block NSs. By separating out the Operator role, another role other than the Operator role, e.g. someone else in the telecommunication organization or a third party such as an system integrator, can publish and make available NS designs for consumption by multiple different operators taking the Operator role to create SNS(s).

FIG. 1 is a schematic diagram illustrating a network service (NS) architecture. The NS 2 illustrated in FIG. 2 comprises cloud resources 3, the cloud resources sub-systems include storage, an analytical database, a monitoring system, a DNS and a key vault. The analytical database enables uploading of log files, metrics and other analytics data produced by a NS during operation. NS 2 further comprises three network functions (NFs) 1a, 1b, 1c that communicate with cloud resources 3. The number of NFs in a NS varies depending upon a required function of the NS. A NF is a composite application and the illustrated schematic of NF 1 is shown as comprising a database and a plurality of virtual machines (VMs). Each NF 1a, 1b, 1c may be created by a different vendor. NS 2 may be designed by a party, such as a telecommunication service operator, a vendor of a NF, or a system integrator. As a minimum, however, an NFs vendor should support some form of declarative configuration interface to install, update, or reconfigure the NF.

Figure 2:
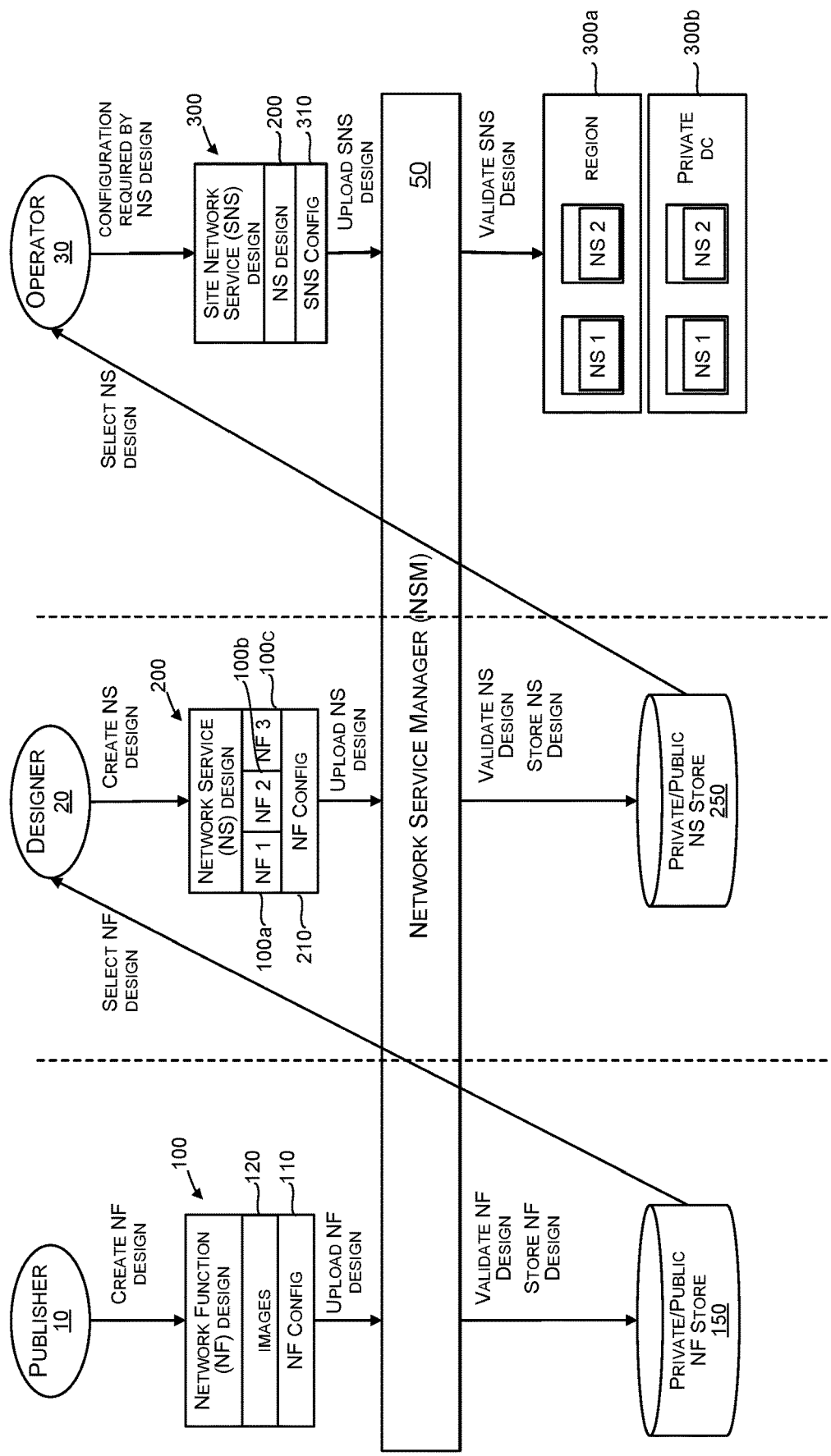
FIG. 2 is a schematic diagram of a service for designing and deploying a site network service (SNS)

FIG. 2 is a schematic diagram of a service for designing and deploying a site network service (SNS). A SNS design 300 is specified for a site, which may be a data center either on a first or a third-party premises. The SNS design 300 points to a specific version of the NS design, and the NF design(s) incorporated therein. The associated SNS configuration data 310 includes configuration group values (CGV) that provide information for configuring the NS design 200. The service illustrated in FIG. 2 enables a SNS to be designed by three separate users/parties 10, 20, 30 with each taking one of three distinct roles in a manner that reduces the likelihood of downtime of the site where the SNS design 300 is deployed due to a reduced likelihood of errors with the SNS design. Each role may be performed by an individual or a team.

In FIG. 2, the three roles are labelled Publisher 10, Designer 20 and Operator 30. The name given to each of the roles is not intended to be restrictive as to its function and has no connotations to other names used in the art. Alternative names for the three roles may be first role for Publisher 10, second role for Designer 20 and third role for Operator Rather, the important aspect is that the roles are configured separately and they are hierarchical in that a higher role builds off a work product of a lower role. For example, the Designer 20 role is intermediate and builds a work product from that of Publisher 10 who has a lower hierarchical role. In turn, the Operator 30 has the highest hierarchical role of the three roles and builds a work product that incorporates a work product from the Designer 20, which itself incorporates a work product from the Publisher 10.

A user of the system illustrated in FIG. 2 may be a person representing an entity, such as a corporation, or a team or people. The same user may take one or more separate roles. As will be discussed below, each role has at least one respective interface for engaging with the system.

The lowest of the three hierarchical roles is termed Publisher 10, which may be a vendor that builds software for a NF. Publisher 10 provides images 120 (or a reference to images) and NF configuration information 110 that may comprise configuration scripts and/or parameters together with a list of the resources for NF 100. Images 120 may be binary images, i.e. compiled code that executes, or a reference thereto. By a NF design referencing a binary image, which may be simply referred to as an image, an NF design 100 captures a logical structure of the corresponding NF but the NF design not tied to a specific version of the underlying binary image(s). An advantage is provided in that most NFs will need to be patched with bug fixes, security updates, or the like, and the described system negates having to upload a brand-new version of a NF design if nothing other than a binary image of the NF has changed. Therefore, the same NF design version can map to different code levels, and this is done by having it reference a binary image. Binary images are physically separate files to NFs and may be stored in a different repository to NF designs therefore a reference between binary images(s) and NF design(s) is provided.

In FIG. 2, after Publisher 10 has created NF design 100, NF design 100 is uploaded to Network Service Manager (NSM) service 50. The created NF design is validated by the service and subsequently stored in a NF store 150. The validation of the NF design 100 optional but, if performed, may be performed by the NSM 50 service or by a further service not illustrated in the figure. Validation of the NF design 100 includes reviewing the format of the NF design and identifying errors such a misspelt functions or misspelt configurations prior whereinafter the identified errors are sent to Publisher 10.

Designer 20 role is an intermediate role and creates a NS design 200 based on one or more NF designs stored in NF store 150. The NF design(s) may be the same or different to those created by Publisher 10. In FIG. 2, one NF store 150 is illustrated, however the illustrated NF store 150 may be a plurality of NF stores that are at least partially synchronized.

Designer 20 creates NS design 200 that comprises references to a plurality of NF designs 100*a*, 100*b*, 100*c* and NS configuration information 210. The NS configuration information 210 may include references to cloud resources as described later. The Designer's choice of NF functions may correspond to requirements for an overall site network service that is to be designed. In one example NS design 200 is a template defining a schema of the NS and defining how to map the schema to a set of NFs and a declarative configuration for those NFs, and cloud resources that will be instantiated when creating the overall SNS. In this example, Designer 20 is responsible for partitioning the schema of the NS design into configuration groups and defining mapping rules. The above-described efficiency derived from referencing between binary images 120 and NF designs 100 is also applicable to referencing between an NS design and one or more NF designs, whereby if a NS design 200 references an NF design 100*a*, a new NS design 200 does not have to be created if there is a new version of the NF design 100*a*.

The NS design 200 is uploaded to NSM 50 where it may be validated and subsequently stored in NS store 250. Validation of the NS design comprises reviewing the NF design components and determining whether the NS design will operate properly. This may include determining whether the ordering sequence of the NFs is correct and/or whether there is a logical fault, e.g., where NF 1 must come before NF 2 but also NF 2 must come before NF 1, or there is a circular loop, etc. In FIG. 2, one NS store 250 is illustrated, however the illustrated NS store 250 may be a plurality of NS stores that are at least partially synchronized. The step of validating the NS design is an advance of the disclosed system as if an Operator role selected and configured NF design(s) to make a SNS for deployment, there would be no step to conduct the additional verification that detects errors with NS designs that could otherwise be deployed causing site downtime.

Operator 30 has the highest hierarchy of the three roles and may, for example, be a telecommunications operator. Operator 30 creates a site network service (SNS) design that comprises a NS design 200 from the NS store 250 and a SNS configuration 310. The SNS configuration 310 includes parameters specified by the NS design 200 to configure the NS design 200 for deployment. There may be different versions of NF and NS designs in their respective data stores with different versions having different configuration requirements.

The SNS design 300 includes SNS configuration information 310 required to configure aspects of NF designs 100*a*, 100*b*, 100*c* within the NS design 200 (and the encompassing SNS design 300), however the number of configurations that Operator 30 is required to enter to configure the NS design 200 is fewer than the number of configurations that are required by NF designs 100*a*, 100*b*, 100*c* due to prior configuration work performed by Designer 20. The completed SNS design 300 is uploaded to NSM 50 where a SNS is prepared prior to deployment at a site. Optionally, NSM 50 will validate parameters of SNS configuration 310 to ensure those parameters match configuration schemas referenced in the NS design(s) 100*a*, 100*b*, 100*c* then use NS configuration information 210 (that includes mapping rules) to identify what which resources should be created prior to instantiation at the site. Validation may also determine whether configuration variables provided by Operator 30 are of a correct syntax, and/or are within a predetermined limit, either an absolute limit or a ratio of another entered configuration variable, e.g., "variable A should not be greater than double variable B".

As part of the NS configuration 210, Designer 20 creates a configuration schema for NS design 200. The configuration schema does not allow every possible NF configuration parameter to be specified by an Operator 30, but rather only configuration parameters required by NS design 200. When creating NS design 200, Designer 200 selects parameters that are logically appropriate for a subsequent Operator 30 to be able to change in the respective NS design 200, which will be not be the same as the superset of all the configuration parameters of the component NF designs 100*a*, 100*b*, 100*c*.

FIG. 2 further illustrates an instantiation step where two SNS designs are deployed at two exemplary sites: a regional data center 300*a*, and a private data center 300*b*. Each data center 300*a*, 300*b* deployment includes two network services. Using the illustrated system, Operator 30 can orchestrate, i.e. deploy, operate and/or reconfigure, network services at one or more sites.

The SNS supports a 5G network service, i.e., a fifth-generation technology standard for broadband cellular networks. The SNS design supports both physical network functions (by the described NF) and virtual network functions that can run in the cloud (by the cloud services described in the examples herein). Virtual network functions, also known as network function virtualization, can replacing network functions such as firewalls, load balancers and routers with virtualized instances running as software to make a 5G SNS easier to scale and cheaper to implement and maintain. The SNS can also support multi-access edge computing to move applications from a centralized data center to an edge of a network. The present examples can therefore provide a service-based architecture supporting a 5G network.

Figure 3:
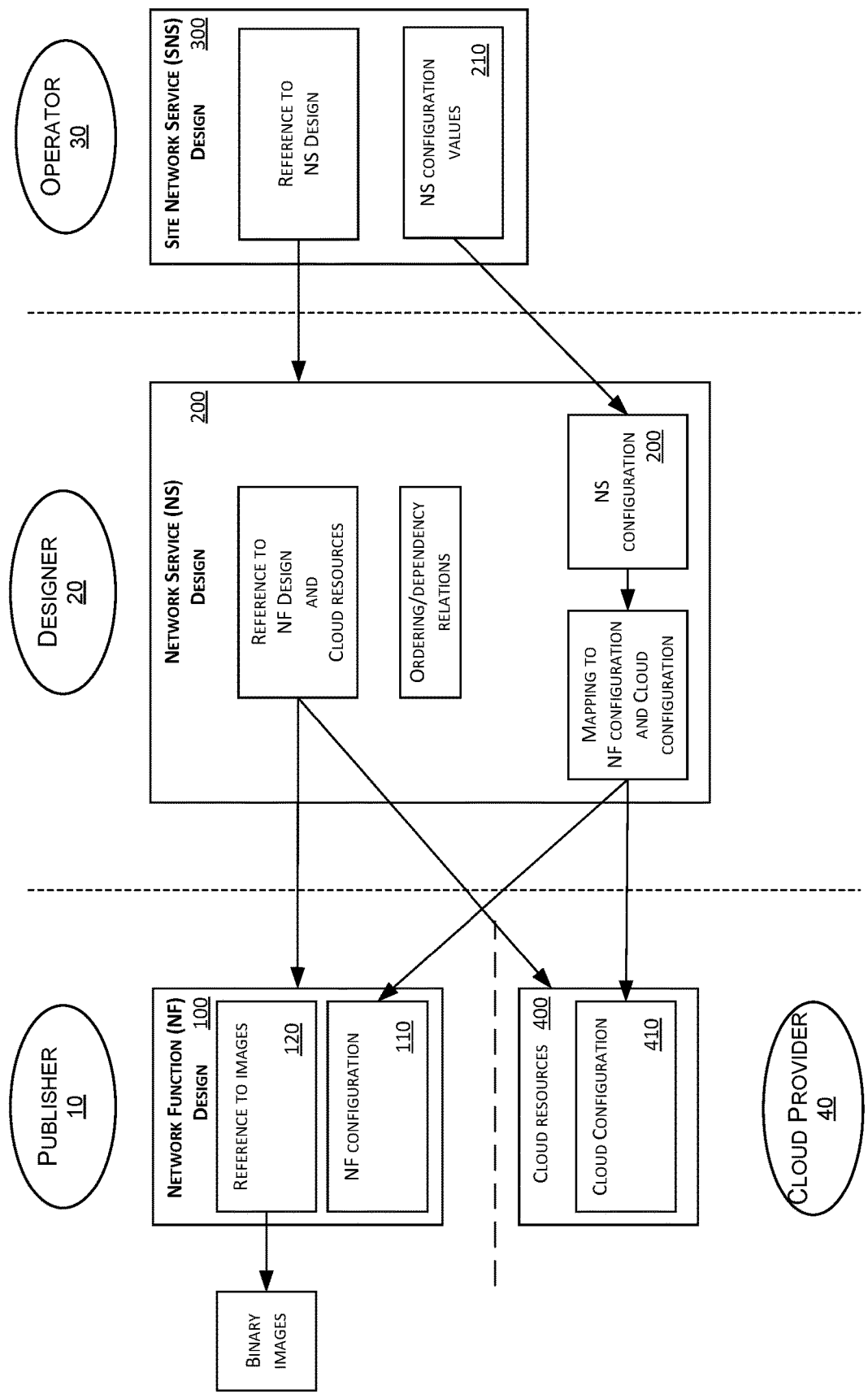
FIG. 3 is a schematic diagram illustrating a flow of components for designing a SNS.

FIG. 3 is a schematic diagram illustrating a flow of components for designing a site network service (SNS) 300. Publisher 10 role creates a NF design 100 comprising a reference to binary images and a NF configuration 110. The NF configuration 110 comprises information for configuring referenced images of the NF design 100.

Cloud resources 400 are available and support the functioning of a SNS. Cloud resources 400 are provided by cloud provider 40 and include a cloud configuration 410. Cloud resources may include infrastructure elements such as virtual networks and storage disks, or platform services such as databases, load balancers, firewalls, and the like. The cloud configuration 410 is information to configure respective cloud resources. Steps of uploading, validation and storing are not illustrated in this figure for any role.

Designer 20 role has access to NF designs 100 and cloud resources 400. The NF designs may be stored in a single or multiple repositories. Designer 20 creates a NS design 200 using a reference to one or more NF designs 100 and also reference(s) to cloud resources 400. If there are multiple NF designs referenced by the NS design 200 then the NF designs are ordered. Dependences for resources for the NF design(s) are arranged. In order to create a NS configuration 210 for the NS design 200, a mapping for some NS configuration setting to NF configuration(s) 110 and cloud configuration(s) 410 is created.

Operator 30 role creates a SNS design 300 by referencing NS design(s) 200 and providing NS configuration values 210 that correspond to the NS configuration 210 being referenced.

Figure 4:
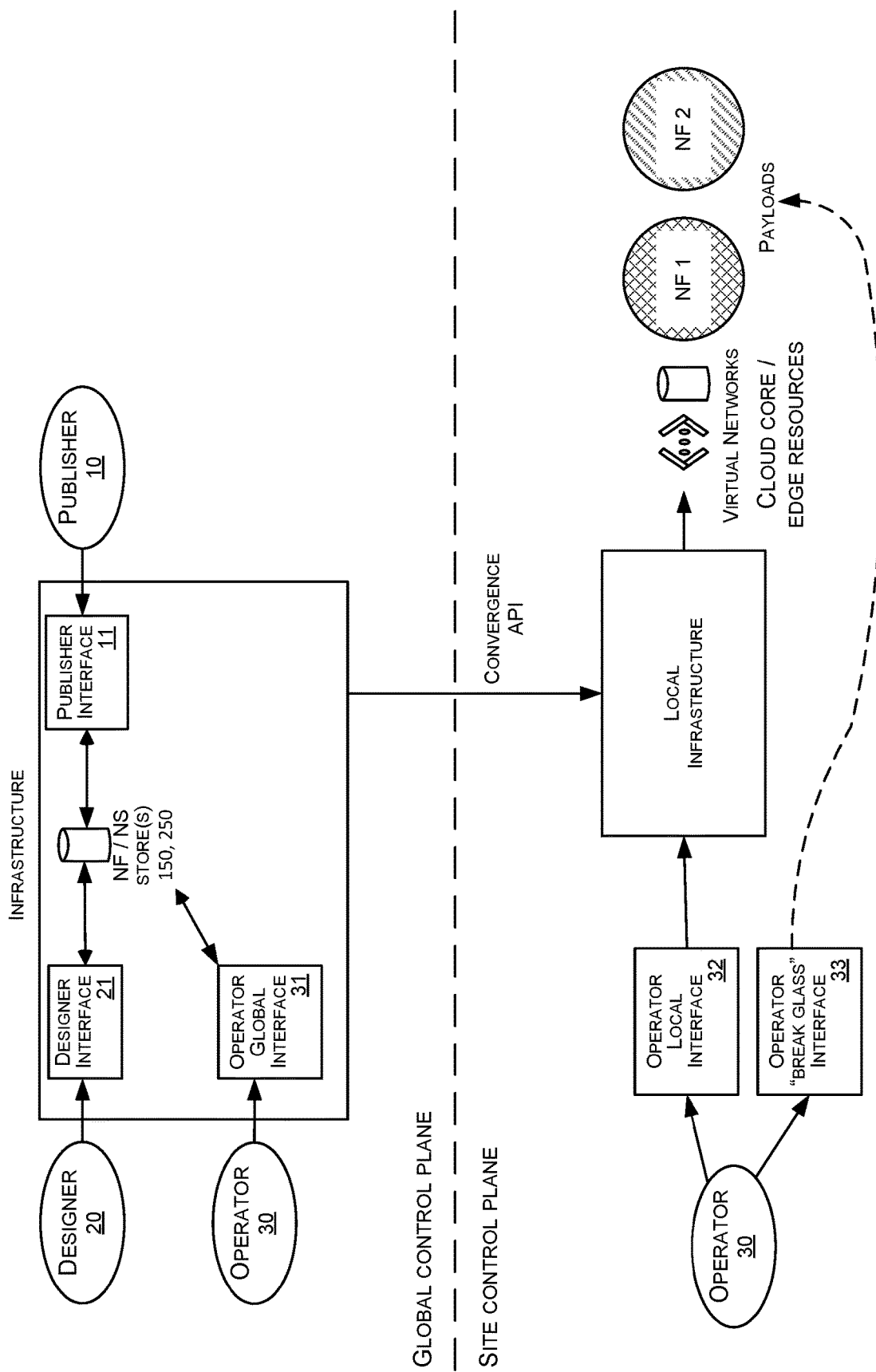
FIG. 4 is a schematic diagram illustrating infrastructure for deploying and managing a SNS.

FIG. 4 is a schematic diagram illustrating infrastructure for deploying and managing a SNS. The illustrated system enables Operator 30, e.g., a telecommunications operator, to orchestrate a SNS with decreased complexity, decreased likelihood of errors and in a reduced amount of time when compared to prior art systems. Operator 30 can create SNSs and orchestrate them following a safe deployment process (rollout of the SNS side-by-side across multiple sites in a controlled way and allowing for incremental testing).

In FIG. 4, Publisher 10, Designer 20 and Operator 30 each have separate interfaces 11, 21, 31. In the global control plane in the top half of the figure, each interface 11, 21, 31 enables the corresponding role to retrieve and/or store information in NF and/or NS stores 150, 250. Operator 30 creates a SNS design that is transmitted to local infrastructure using a convergence API to deploy the SNS design as a SNS at a local site. In the figure, two NFs are illustrated being deployed on virtual networks operating on a cloud core and edge resources. For deployment, the SNS design passes from global control plane to site control plane on the lower half of the figure. An Operator instruction to pass a SNS design from the global control plane to the local control plane will trigger automatic orchestration/deployment of the site network service design.

In the illustrated example, Operator 30 has additional interfaces: Operator local interface 32 and/or Operator "break glass" interface 33. Operator "break glass" interface 33 may also be known as Operator direct interface. Operator local interface 32 and Operator "break glass" interface 33 enable Operator 30 to directly configure NFs and cloud resources, bypassing any orchestration service.

Operator local interface 32 enables Operator 30 to configure a SNS design locally and have the locally configured SNS design deployed via local infrastructure at a site.

Operator "break glass" interface 33 enables Operator 30 to, conditional on Operator 30 being authorized to do so, configure one or more locally deployed NFs at a particular site. In some examples, automated orchestration/deployment of a SNS can be automatically interrupted in the event that an emergency situation occurs, such as the site losing one or more connections with another site or the site service not behaving as expected. In this situation, a currently ongoing orchestration is halted and an emergency upgrade takes place; an additional orchestration is performed in parallel; or some of the initial orchestration is reperformed.

Each illustrated interface 11, 21, 31, 32, 33 represents a specific custom interface designed for each roll, this may be a customized user interface for each roll with the Operator roll having a single user interface that reconfigures to provide up to three respective interfaces 31, 32, 33.

Operator 30 role being separate from Designer 20 role enables those two roles to each utilize a distinct set of people, e.g. an individual, company or team. Operator 30 is able to deliver an end-to-end network service, a SNS, and can interact directly with the SNS design, directly deploy the SNS design and manage the SNS design rather than having to design and configure individual NFs. From the Operator 30 perspective, no knowledge or access to individual NFs is required which means that misconfiguration of a NF is less likely using the system described and illustrated herein. Also, security is improved as the SNS configuration 310 settings is a subset of the NF configuration settings 110 for the NFs being orchestrated, hence a further layer of security is provided by the disclosed system. The role of the Designer 20 is to perform a large amount of configuration work on the NF design(s) 100 that form part of a NS design 200. As an example, with the system disclosed herein, rather than Operator 30 having to know 5000 different configuration parameters that are an aggregate of all the configuration parameters for the individual NFs available, instead Operator 30 has a simpler interface with ten or so parameters to configure. Designer 20, in creating an NS design 200, maps NS parameters to NF parameters to reduce the number of NS parameters. The ten parameters form part of the SNS configuration 310.

Designer 20 also performs ordering and sequencing for individual NFs designs 100 in a NS design 200, e.g., which NFs must be upgraded or replaced first and/or which versions of respective NFs are incompatible. This ordering and sequencing information form part of the NS configuration 210, which is part of the NS design 200.

Figure 5:
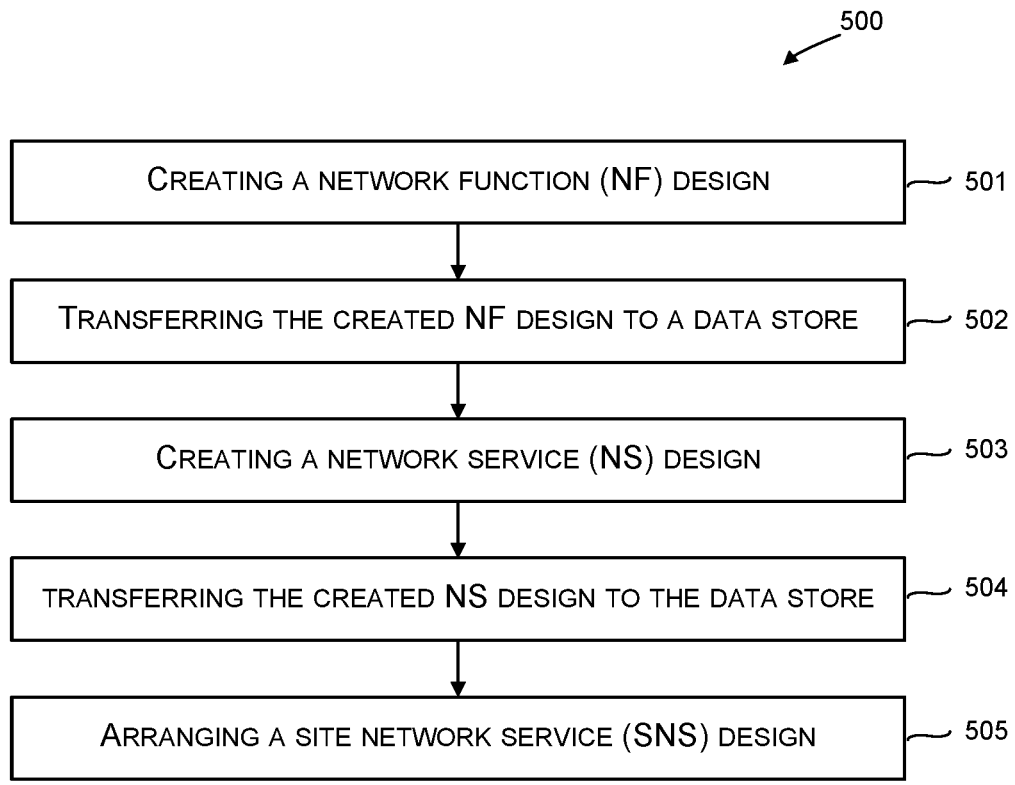
FIG. 5 is a flow diagram of a method for creating a SNS design.

FIG. 5 is a flow diagram of a method 500 for arranging a SNS design. The method comprises:

At block 501, creating a NF design.

At block 502, transferring the created NF design to a data store.

At block 503, creating a NS design. The created NS design comprises a reference to a NF design from the data store, and a NS configuration comprising information to partially configure the referenced NF design.

At block 504, transferring the created NS design to the data store.

At block 505, arranging a SNS design. The arranged SNS design comprises a reference to a NS design from the data store and a SNS configuration. The SNS configuration comprises information to fully configure the NF design referenced by the NS design.

Figure 6:
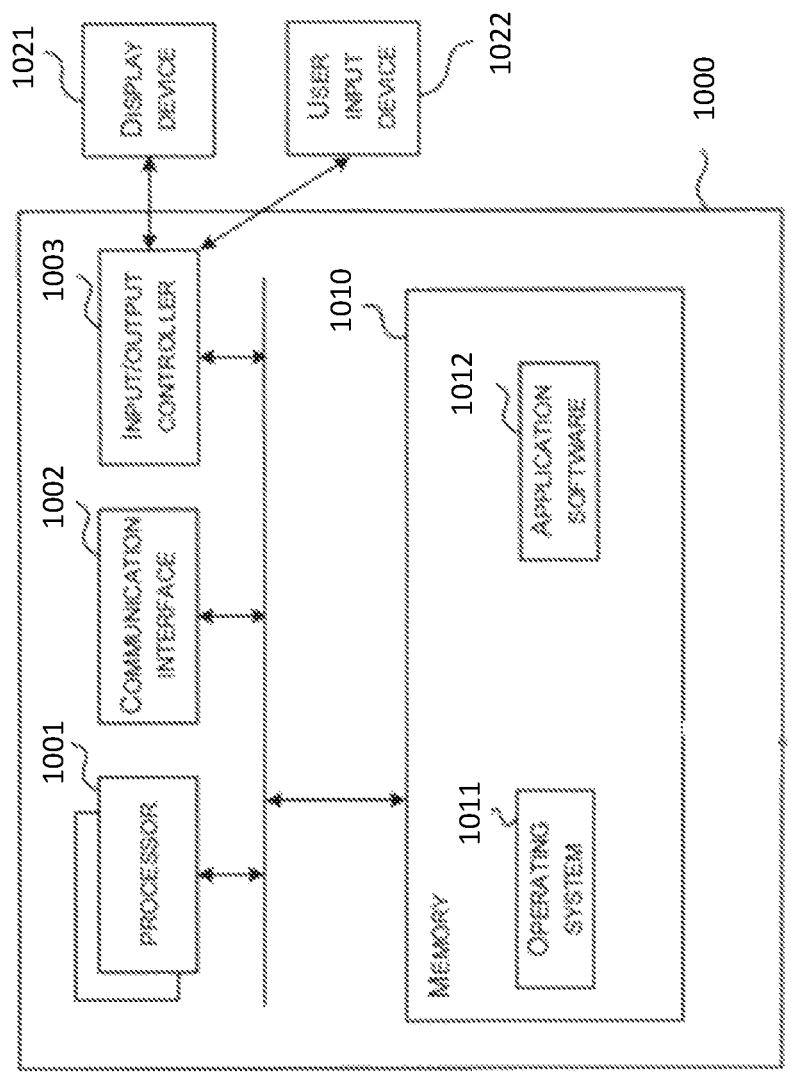
FIG. 6 illustrates an exemplary computing-based device in which examples of the disclosure can be implemented.

FIG. 6 illustrates various components of an exemplary computing-based device 1000 which are implemented as any form of a computing and/or electronic device, and in which some above examples can be implemented. The device 100 illustrates a commuting platform that the NSM 50 could be run on. Additionally, terminals supporting one or more of the roles (Publisher 10, Designer 20 and Operator 30) may be run on a device such as device 1000 that may render a UI and also transmit data to and from a further device supporting NSM 50. In other examples, NSM 50 and/or real or virtual computers supporting each of the roles may be run on a cloud computing system operating in a data center.

Computing-based device 1000 comprises one or more processors 1001 which are microprocessors, controllers or any other suitable type of processors for processing computer executable instructions to control the operation of the device. In some examples, for example where a system on a chip architecture is used, the processors 1001 include one or more fixed function blocks (also referred to as accelerators) which implement a part of the claimed method in hardware (rather than software or firmware). Platform software comprising an operating system 1011 or any other suitable platform software is provided at the computing-based device to enable application software 1012 to be executed on the device.

The computer executable instructions are provided using any computer-readable media that is accessible by computing-based device 1000. Computer-readable media includes, for example, computer storage media such as memory 1010 and communications media. Computer storage media, such as memory 1010, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1010) is shown within the computing-based device 1000 it will be appreciated that the storage is, in some examples, distributed or located remotely and accessed via a network or other communication link (e.g., using communication interface 1002).

The computing-based device 1000 also comprises an input/output controller 1003 arranged to output display information to a display device 1021 which may be separate from or integral to the computing-based device 1000. The display information may provide a graphical user interface. The input/output controller 1003 is also arranged to receive and process input from one or more devices, such as a user input device 1022 (e.g., a mouse, keyboard, camera, microphone or other sensor). In some examples the user input device 1022 detects voice input, user gestures or other user actions and provides a natural user interface (NUT). This user input may be used to create NF designs, NS designs, site network services or control aspects thereof. In an example, the display device 1021 also acts as the user input device 1022 if it is a touch sensitive display device. The input/output controller 1003 outputs data to devices other than the display device in some examples, e.g., a locally connected printing device (not shown in FIG. 6.

Any of the input/output controller 1003, display device 1021 and the user input device 1022 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The methods disclosed herein may be performed by a data processing apparatus, device or system comprising means for carrying out one or more of the methods; a computer program comprising instructions which, when the program is executed by a computer, cause the computer to carry out one or more of the methods; and/or a computer-readable medium comprising instructions which, when executed by a computer, cause the computer to carry out one or more of the methods.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or It will be understood that the above description is given by way of example only and that various modifications may be made by those skilled in the art. Although various embodiments and examples have been described above with a certain degree of particularity, or with reference to one or more individual embodiments, those skilled in the art could make numerous alterations to the disclosed examples and embodiments without departing from the scope of this specification.

What is claimed is:

1. A computer-implemented method for deploying a site network service (SNS) design in a computing system, the method comprising:
   receiving a network function (NF) design;
   transferring the NF design to a data store;
   generating a network service (NS) design, wherein the NS design comprises a reference to a NF design from the data store and a NS configuration comprising information for partially configuring the referenced NF design;
   validating at least one of the NF design or the NS design prior to storage in the data store, wherein validating the NS design comprises detecting errors relating to an arrangement of a plurality of NF designs comprised by the NS design;
   transferring the NS design to the data store; and
   deploying a SNS design, wherein the SNS design comprises a reference to the NS design from the data store and a SNS configuration, wherein the SNS configuration comprises information for fully configuring the NF design referenced by the NS design.

2. The method of claim 1, wherein the NF design comprises:
   a reference to at least one image, and
   a reference to a network function configuration.

3. The method of claim 1, wherein the method is performed by a network service manager system.

4. The method of claim 3, wherein the network service manager system operates partially or wholly in one or more data centers.

5. The method of claim 1, wherein arranging the NF design, creating the NS design and arranging the SNS design each require a separate user role.

6. The method of claim 5, wherein each role has a respective user interface for arranging each respective design.

7. The method of claim 1 further comprising, after the SNS design is arranged, deploying the SNS design at a site.

8. The method of claim 7 further comprising, after the SNS design is deployed at the site, configuring a NF that was deployed as part of the deployed SNS, wherein the arranging the SNS design and the configuring the deployed NF is performed by a single user.

9. The method of claim 7 further comprising, after the SNS is deployed, reconfiguring the SNS design at infrastructure local to the site and redeploying the reconfigured SNS design at the site.

10. The method of claim 1, wherein the SNS design is operable to provide a telecommunications service.

11. The method of claim 1, wherein the site network service design supports a 5G technology standard for a broadband cellular network.

12. The method of claim 1, wherein
    the NS design comprises a plurality of NF designs, and
    the NS design is generated by entering dependency relations of the plurality of NF designs.

13. The method of claim 1, further comprising retrieving the SNS design from the data store and deploying the SNS design in one or more data networks.

14. The method of claim 1, wherein the SNS comprises information relating to a setting that is mapped, by the NS design, to a plurality of settings of the NF design.

15. The method of claim 14, wherein the mapping is used to fully configure the NF design.

16. A computerized system for arranging a site network service (SNS) design, the system comprising:
    a processor; and
    computer storage memory having computer-executable instructions stored thereon which, when executed by the processor, cause the computerized system to perform operations comprising:
    receiving a network function (NF) design;
    transferring the NF design to a data store;
    generating a network service (NS) design, wherein the NS design comprises a reference to a NF design from the data store and a NS configuration comprising information for partially configuring the referenced NF design;
    validating at least one of the NF design or the NS design prior to storage in the data store, wherein validating the NS design comprises detecting errors relating to an arrangement of a plurality of NF designs comprised by the NS design;
    transferring the NS design to the data store; and
    deploying a SNS design, wherein the SNS design comprises a reference to the NS design from the data store and a SNS configuration, wherein the SNS configuration comprises information for fully configuring the NF design referenced by the NS design.

17. A computerized system for arranging a site network service (SNS), the system comprising:
    a processor; and
    computer storage memory having computer-executable instructions stored thereon which, when executed by the processor, cause the computerized system to perform operations comprising:
    displaying a plurality of network service (NS) designs;
    receiving a selection of a NS design from the displayed NS designs;
    receiving configuration values for the selected NS design;
    applying the received configuration values to a network function (NF) that is contained by the selected NS design, thereby fully configuring a design of the NF;
    creating a SNS using the selected NS design and the fully configured NF design; and validating at least one of the fully configured NF design or the selected NS design prior to storage in a data store, wherein validating the selected NS design comprises detecting errors relating to an arrangement of a plurality of NF designs comprised by the NS design.

18. The computerized system of claim 17, further comprising computer-executable instructions stored thereon which, when executed by the processor, cause the computerized system to perform operations comprising saving the SNS and deploying the SNS.

* * * * *